United States Patent
Fang (10) Patent No.: US 7,454,099 B2
(45) Date of Patent: Nov. 18, 2008

(54) OPTICAL CHANNEL SHIFTING DEVICE

(75) Inventor: Chih-Jung Fang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/748,012

(22) Filed: May 14, 2007

(65) Prior Publication Data

US 2007/0269161 A1    Nov. 22, 2007

(30) Foreign Application Priority Data

May 16, 2006   (TW)   ............................... 95117283 A (51) Int. Cl.
*G02B 6/26*   (2006.01)
(52) U.S. Cl. ............................... 385/16; 385/15; 385/22
(58) Field of Classification Search .................... 385/15, 385/16, 22
See application file for complete search history.

(56) References Cited

U.S. PATENT DOCUMENTS

2004/0001668 A1*   1/2004   Smith et al. .................... 385/22

* cited by examiner

*Primary Examiner*—Jennifer Doan
(74) *Attorney, Agent, or Firm*—Thomas, Kayden, Horstemeyer & Risley (57) ABSTRACT

An optical channel shifting device includes a containing unit having a first inner space and a second inner space adjacent to the first inner space, an input optical fiber held in the first inner space, an output unit having a first output optical fiber and a second output optical fiber and a driving assembly held in the second inner space. The containing unit includes a first side, a second side opposite to the first side and two guiding channels located between the first side and the second side and held in the first inner space. The first output optical fiber and the second output optical fiber are respectively fixed in the guiding channels. The driving assembly includes a switching lever shifted in either a first position or a second position and a performing edge connected with the switching lever and attached with the input optical fiber in the form of the point-contact.

7 Claims, 7 Drawing Sheets

OPTICAL CHANNEL SHIFTING DEVICE

RELATED APPLICATIONS

The application claims priority to Taiwan Application Serial Number 95117283, filed May 16, 2006, which is herein incorporated by reference.

BACKGROUND

1. Field of Invention

The present invention relates to a signal shifting device, and more particularly to an optical channel shifting device.

2. Description of Related Art

Figure 1:
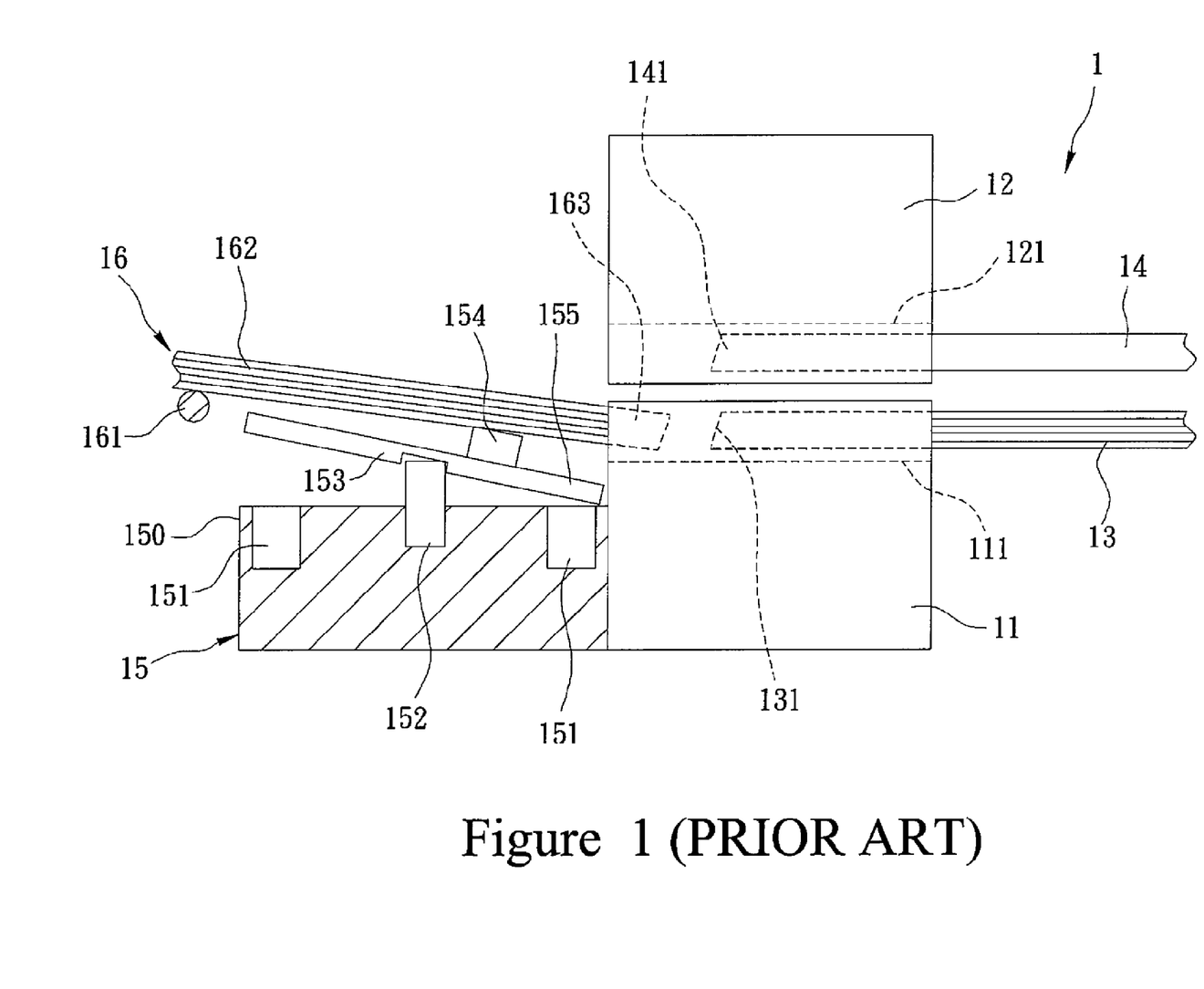
FIG. 1 is a schematic side view of a conventional optical fiber channel adjuster wherein an input optical fiber is located beneath.
Figure 2:
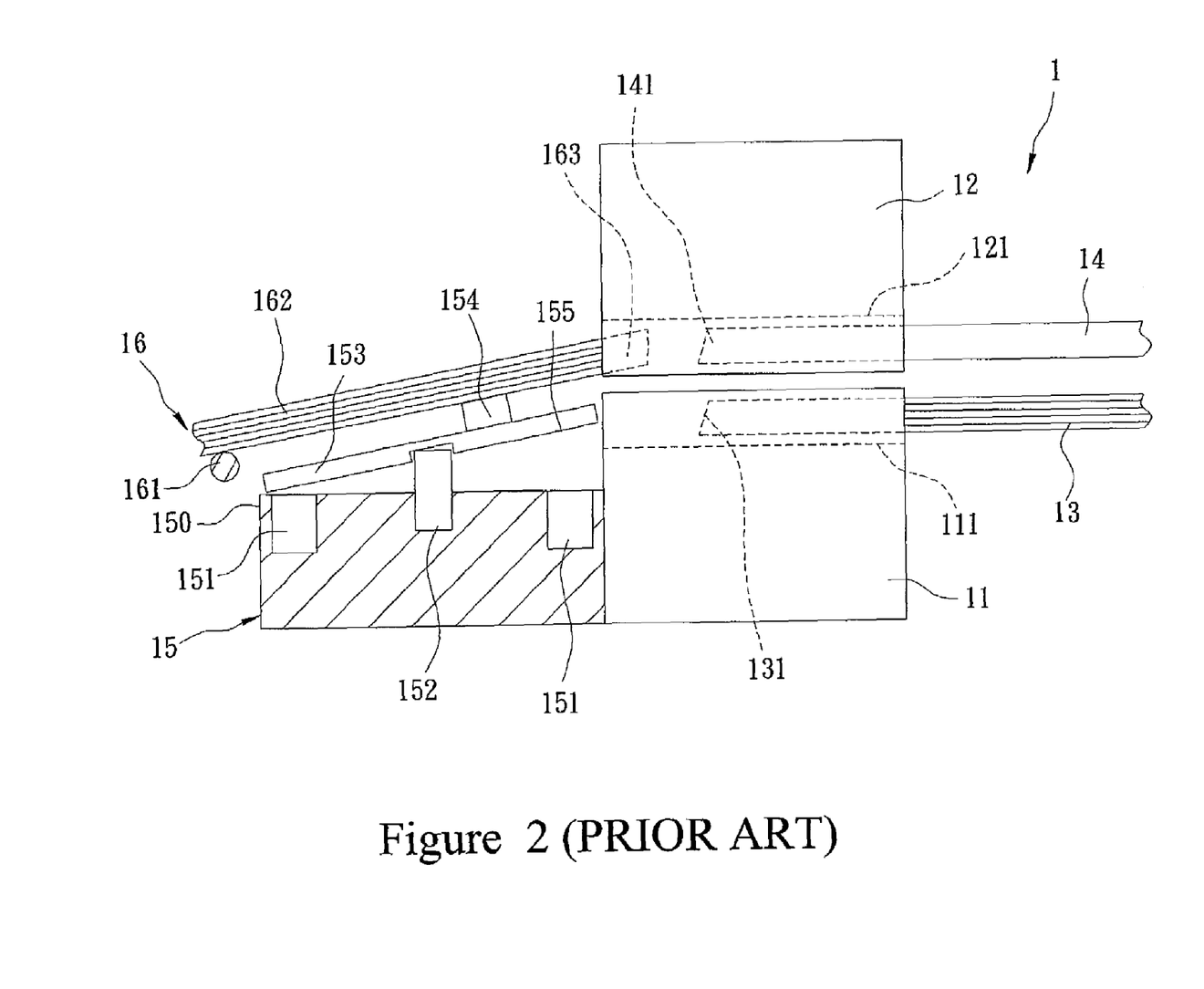
FIG. 2 is a schematic side view of the conventional optical fiber channel adjuster wherein the input optical fiber is located above.

Refer to FIG. 1 and FIG. 2. An optical fiber channel adjuster 1 includes a first optical fiber aligner 11, a second optical fiber aligner 12, a first output optical fiber 13, a second output optical fiber 14, a relay 15 and an input unit 16. The first optical fiber aligner 11 has a first V-type indentation 111 and the second optical fiber aligner 12 has a second V-type indentation 121 parallel to the first V-type indentation 111. The first output optical fiber 13 is mounted in the first V-type indentation 111 and the second output optical fiber 14 is mounted in the second V-type indentation 121.

The relay unit 15 includes a container 150, two electromagnets 151, a supporting shaft 152, a performing lever 153 and a rectangular block 154. The electromagnets 151 are fixed in the container 150 bilaterally. The supporting shaft 152 is secured between the electromagnets 151. The performing lever 153 is jointed on the supporting shaft 152. The rectangular block 154 is mounted on a surface of the performing lever 153.

The input unit 16 includes a supporting cylinder 161 and an input optical fiber 162. The input optical fiber 162 is supported by the supporting cylinder 161 and retained against the rectangular block 154.

The electromagnets 151 moves a free end 155 of the performing lever 153 between an upper and a lower position. When the free end 155 of the performing lever 153 is moved and kept in the lower position, the rectangular block 154 mounted on the surface of the performing lever 153 pushes a terminal 163 of the input optical fiber 162 into alignment with a terminal 131 of the first output optical fiber 13. When the free end 155 of the performing lever 153 is moved and kept in the upper position, the rectangular block 154 mounted on the surface of the performing lever 153 pushes a terminal 163 of the input optical fiber 162 into alignment with a terminal 141 of the second output optical fiber 14.

As the description above in accordance with the conventional optical fiber channel adjuster 1, the input optical fiber 162 touches the rectangular block 154 in the form of line-contact. In addition, the rectangular block 154 is typically made of stainless steel or ceramics.

On the basis of the durability test for the optical channel shifting, the test standard of the Telcordia GR-0173-CORE $10^7$ cycles must be conformed to. Because of the larger contact area and the friction between the stainless (or ceramic) and the optical fiber, the damage to optical fiber surface results in optical leakage and the increased insertion loss ($\Delta IL > 0.2$ dB) after the $0.5 \times 10^7$ time durability test. As a result, the test standard of the Telcordia GR-0173-CORE $10^7$ cycles cannot be met.

Thus, there is a need to develop an optical channel shifter to reduce the friction caused by the input optical fiber during the shifting period to lessen the insertion loss and meet the durability test standard.

SUMMARY

Therefore, the present invention provides an optical channel shifting device and it includes a containing unit, an input optical fiber, an output unit and a driving assembly.

The containing unit has a first inner space, a second inner space, a first side, a second side and two guiding channels. The first inner space is adjacent to the second inner space. The first side is opposite to the second side. The guiding channels are located between the first side and the second side and are held in the first inner space.

The input optical fiber is located in the first side of the containing unit along a first axis and held in the first inner space. The input optical fiber extends from the first side to the second side along the first axis and includes a first terminal and a second terminal opposite to each other.

The output unit includes a first output optical fiber and a second output optical fiber respectively fixed in the guiding channels along the first axis and a second axis parallel to the first axis. The first output optical fiber includes a first terminal set in the second side and a second terminal adjacent to the second terminal of the input optical fiber. The second output optical fiber comprising a first terminal set in the second side and a second terminal adjacent to the second terminal of the input optical fiber.

The driving assembly is located in the second inner space of the containing unit and includes a switching lever and a performing edge. The switching lever is shifted in a first position and a second position. The performing edge is connected with the switching lever and attached with the input optical fiber in the form of the point-contact. When the switching lever is in the first position, the switching lever moves the performing edge such that the input optical fiber is aligned with the first output optical fiber in the form of optical coupling. When the switching lever is in the second position, the switching lever moves the performing edge such that the input optical fiber is aligned with the second output optical fiber in the form of optical coupling.

As a result, the effect of the optical channel shifting device of the present invention is to reduce the friction of the input optical fiber caused by the optical channel shifting to lessen the insertion loss such that the durability test standard can be conformed to.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 3:
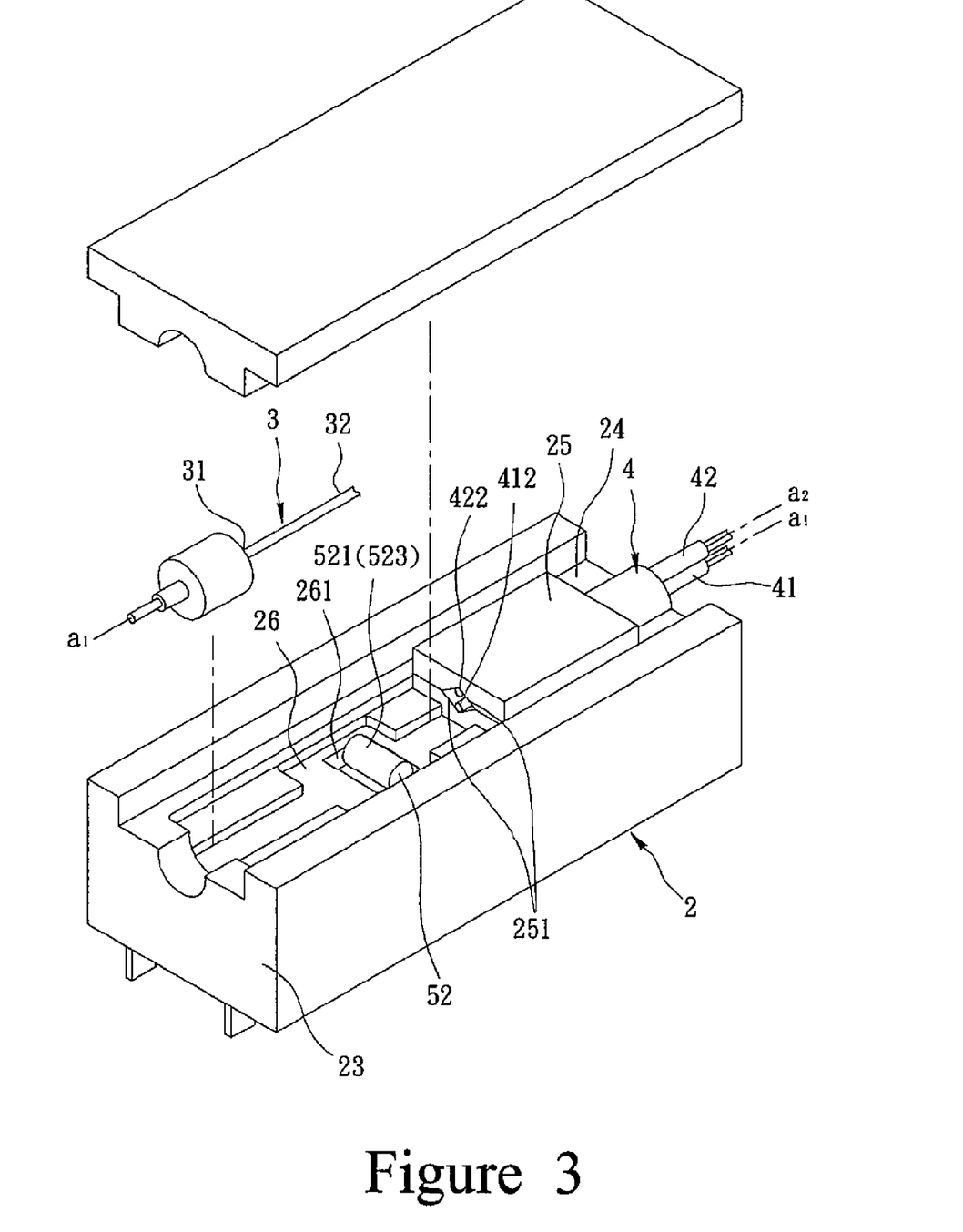
FIG. 3 is an exploded perspective view of an embodiment of the optical channel shifting device in accordance with the present invention.
Figure 4:
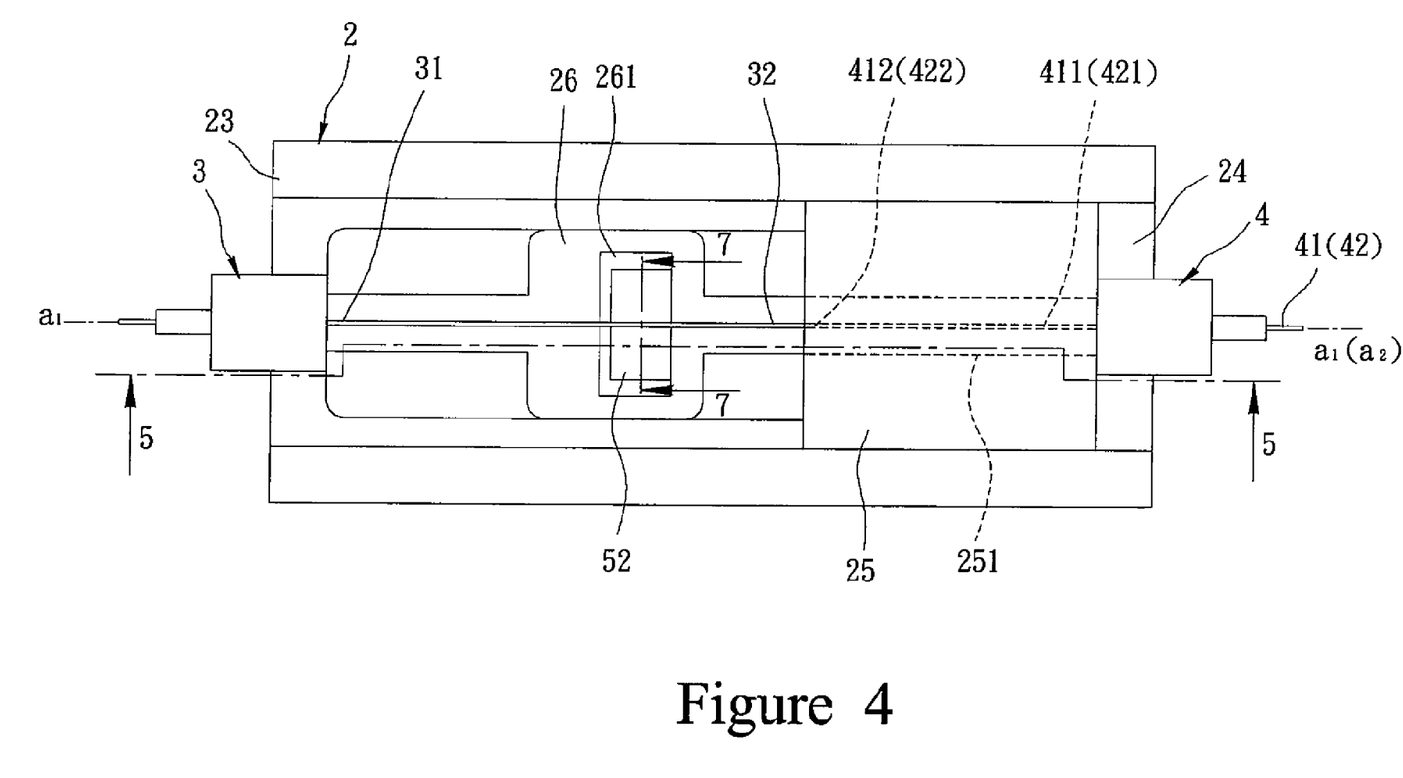
FIG. 4 is a top view of the embodiment in accordance with FIG. 3.
Figure 5:
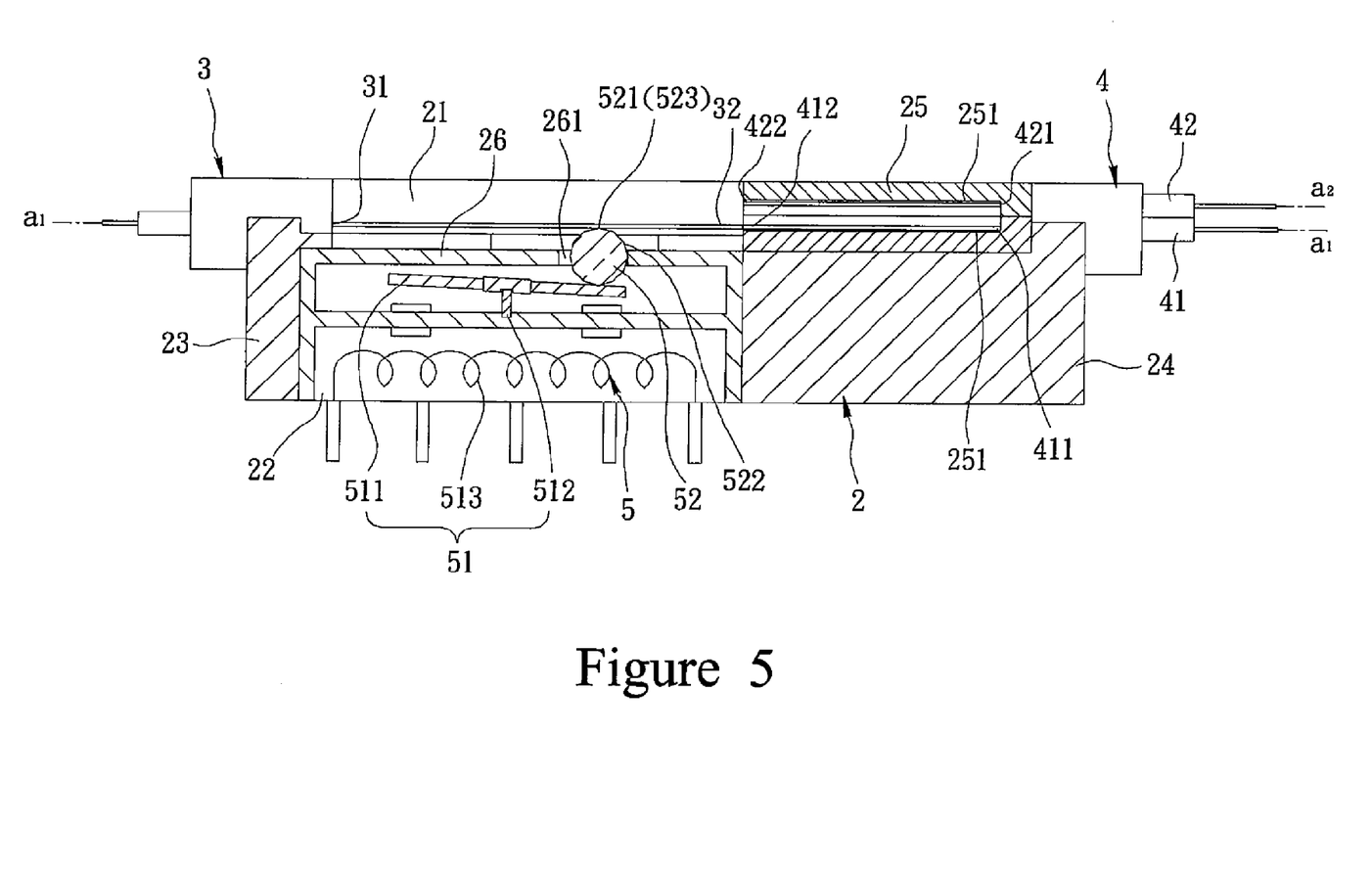
FIG. 5 is a sectional view along the cross line 5-5 in FIG. 4 illustrating the input optical fiber is located in a first position.

Refer to FIG. 3, FIG. 4 and FIG. 5. The embodiment of the optical channel shifting device of the present invention includes a containing unit 2, an input optical fiber 3, an output unit 4 and a driving assembly 5. The containing unit 2 has a first inner space 21 and a second inner space 22 adjacent to the first inner space 21.

The containing unit 2 includes a first side 23, a second side 24, a location block 25 and a separating wall 26. The first side 23 is opposite to the second side 24. The location block 25 is set in the first inner space 21 between the first side 23 and the second side 24. The separating wall 26 defines the first inner space 21 and the second inner space 22. The location block 25 includes two guiding channels 251. The separating wall 26 includes an opening 261 communicating with the first inner space 21 and the second inner space 22.

The input optical fiber 3 is located in the first side 23 of the containing unit 2 along a first axis $a_1$ and held in the first inner space 21. The input optical fiber 3 extends from the first side 23 to the second side 24 along the first axis $a_1$ and includes a first terminal 31 and a second terminal 32, which are opposite to each other.

The output unit 4 includes a first output optical fiber 41 and a second output optical fiber 42. The first output optical fiber 41 and the second output optical fiber 42 are respectively held in the guiding channels 251 along the first axis $a_1$ and a second axis $a_2$, wherein the first axis $a_1$ is parallel to the second axis $a_2$. The location block 25 is located between the input optical fiber 3 and the second side 23. The guiding channels 251 are respectively defined in the location block 25 along the axis direction of the first axis $a_1$ and the second axis $a_2$. The first output optical fiber 41 has a first terminal 411 and a second terminal 412. The second output optical fiber 42 has a first terminal 421 and a second terminal 422 wherein the first terminal 411 and the first terminal 421 are set in the second side 24, and the second terminal 412 and the second terminal 422 are adjacent to the second terminal 32 of the input optical fiber 3.

The driving assembly 5, located in the second inner space 22 of the containing unit 2, includes an electromagnet relay unit 51 and a cylinder 52.

The electromagnet relay unit 51 includes a switching lever 511, a supporting rod 512 and an electromagnetic coil 513. The switching lever 511 is supported by the supporting rod 512 and is controlled to shift in either a first position or a second position through the electromagnetic coil 513.

The cylinder 52 is connected with the switching lever 511 and has a performing edge 521 attached with the input optical fiber 3. The cylinder 52 includes a cylindrical surface 522 along the periphery. The cylindrical surface 522 has a top edge 523 that defines the performing edge 521 wherein the performing edge 521 is shifted in either the first position or the second position through the opening 261. The material of the cylinder 52 of the present invention is made of an amorphous inorganic material. In this embodiment, this amorphous inorganic material is glass.

Figure 6:
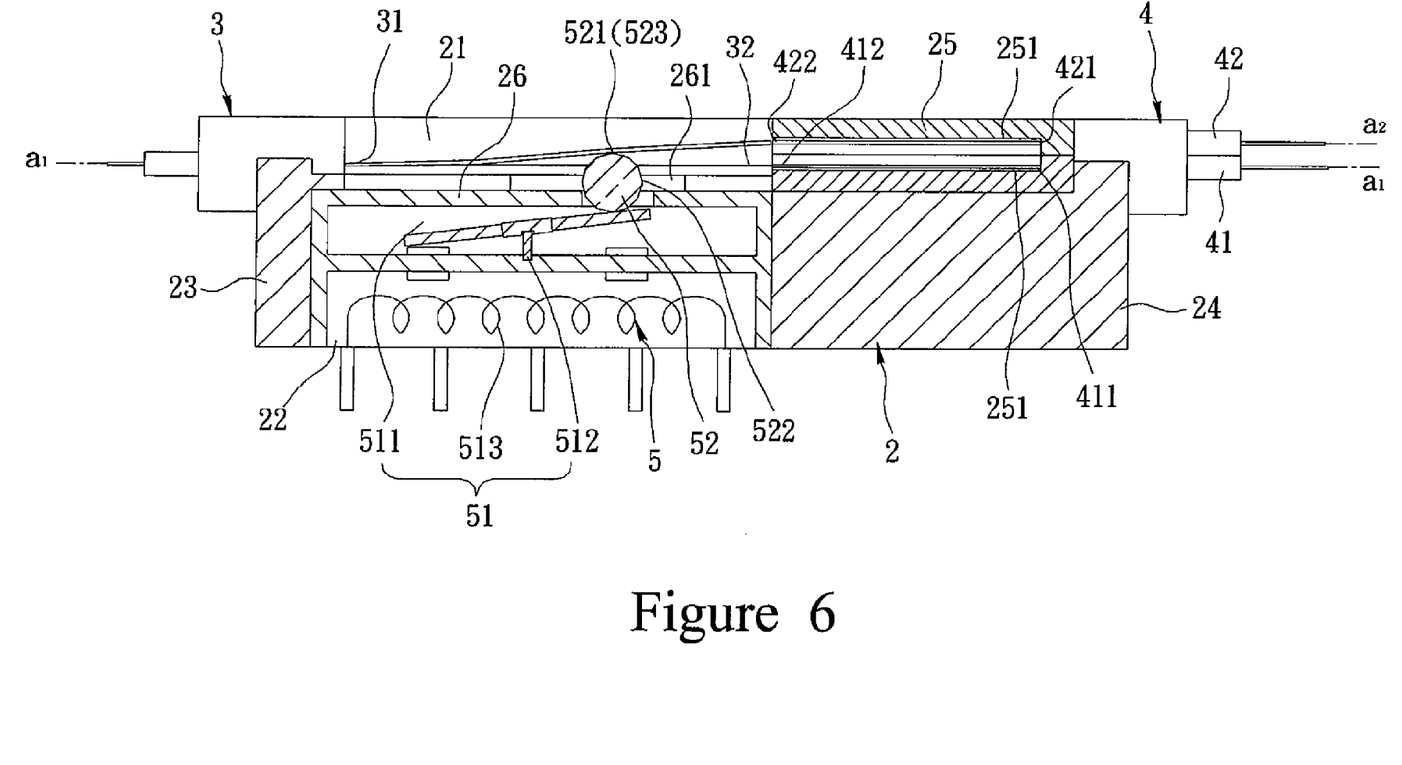
FIG. 6 is a sectional view similar to FIG. 5 illustrating the input optical fiber is located in a second position.

Refer to FIG. 5. When the switching lever 511 is in the first position, the switching lever 511 lowers the performing edge 521 such that the input optical fiber 3 is aligned with the first output optical fiber 41 in the form of optical coupling. Refer to FIG. 6. When the switching lever 511 is in the second position, the switching lever 511 elevates the performing edge 521 such that the input optical fiber 3 is aligned with the second output optical fiber 42 in the form of optical coupling.

Figure 7:
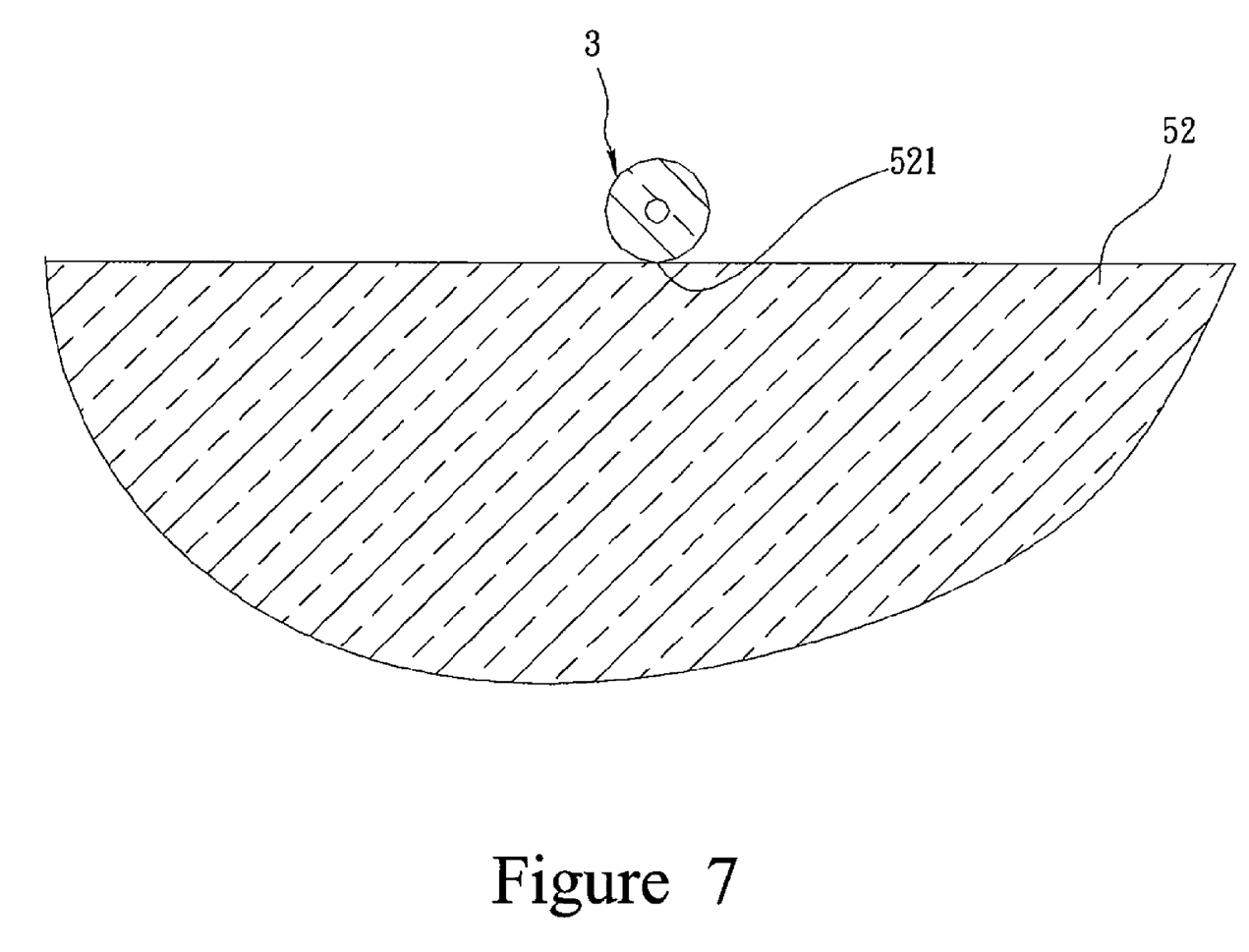
FIG. 7 is a sectional view along the cross line 7-7 in FIG. 4 illustrating the corresponding contact relationship between a cylinder and the input optical fiber.

Refer to FIG. 7. The performing edge 521 of the cylinder 52 touches the input optical fiber 3 in the form of point-contact. Compared with the conventional optical channel adjuster 1, the contact area is reduced in accordance with the aspect of the present invention such that the friction between the input optical fiber 3 and the cylinder 52 during the performance period is relatively decreased. As a result, the optical leakage is diminished because of the lower insertion loss (ΔIL).

In addition, the stainless steel material and the ceramic material are both polycrystals respectively manufactured through the metallurgy process and the sintering process such that particle intensity of these materials is typically stronger than the amorphous material have not been manufactured through the high temperature process. Consequently, the contact or the friction between the glass optical fiber with lower particle intensity and the materials with higher particle intensity (such as the stainless steel or ceramics) results in the damage of the glass optical fiber.

The cylinder 52 in this embodiment is the amorphous inorganic material (glass) with similar hardness to the optical fiber. Therefore, the friction between the input optical fiber 3 and the cylinder 52 during the performance period is lessened such that the optical leakage is diminished because of the lower insertion loss (ΔIL).

The following table 1 displays the analysis dada of the insertion loss among the stainless steel material, the ceramic material and the four pairs of the optical channel shifting devices.

TABLE 1

| Group | Channel | Requirement#(In1500 nm, <1.0 dB) | | | | | | ΔIL <0.2 dB |
|---|---|---|---|---|---|---|---|---|
| | | Initial | $1 \times 10^6$ | $3 \times 10^6$ | $5 \times 10^6$ | $7 \times 10^6$ | $10^7$ | ΔIL |
| First group | CH1* | 0.45 | 0.45 | 0.48 | 0.50 | 0.51 | 0.53 | 0.08 |
| | CH2@ | 0.56 | 0.56 | 0.61 | 0.63 | 0.64 | 0.68 | 0.12 |
| Second group | CH1* | 0.51 | 0.52 | 0.52 | 0.55 | 0.56 | 0.58 | 0.07 |
| | CH2@ | 0.54 | 0.54 | 0.57 | 0.59 | 0.62 | 0.66 | 0.12 |
| Third group | CH1* | 0.47 | 0.46 | 0.49 | 0.52 | 0.55 | 0.57 | 0.10 |
| | CH2@ | 0.57 | 0.56 | 0.58 | 0.60 | 0.64 | 0.70 | 0.13 |

TABLE 1-continued

| Group | Channel | Requirement#(In1500 nm, <1.0 dB) | | | | | | ΔIL <0.2 dB |
| --- | --- | --- | --- | --- | --- | --- | --- | --- |
| | | Initial | $1 \times 10^6$ | $3 \times 10^6$ | $5 \times 10^6$ | $7 \times 10^6$ | $10^7$ | ΔIL |
| Fourth group | CH1* | 0.57 | 0.58 | 0.59 | 0.62 | 0.66 | 0.69 | 0.12 |
| | CH2@ | 0.60 | 0.60 | 0.62 | 0.65 | 0.68 | 0.71 | 0.11 |
| Stainless steel group | CH1* | 0.58 | 0.62 | 0.74 | 0.79 | 0.87 | 0.99 | 0.41 |
| | CH2@ | 0.54 | 0.69 | 0.89 | 1.32 | 2.66 | 3.29 | 2.75 |
| Ceramic group | CH1* | 0.50 | 0.58 | 0.62 | 0.73 | 0.81 | 0.89 | 0.39 |
| | CH2@ | 0.56 | 0.70 | 0.84 | 0.95 | 1.11 | 1.71 | 1.15 |

(#the requirement of the loss insert during the optical coupling; *the channel of the first output optical fiber; @the channel of the second output optical fiber)

In accordance with the table 1, the insertion loss (ΔIL<0.2 dB) for the optical channel shifting device of the embodiment after $10^7$ times shifting durability test are lower than the insertion loss (ΔIL>0.2 dB) for the stainless steel and the ceramic.

As the description above, the friction of the input optical fiber caused by the optical channel shifting is reduced to lessen the insertion loss such that the durability test standard can be conformed.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical channel shifting device, comprising:
   a containing unit with a first inner space and a second inner space adjacent to the first inner space, comprising:
   a first side;
   a second side opposite to the first side;
   two guiding channels located between the first side and the second side and held in the first inner space; and
   a separating wall defining the first inner space and the second inner space and comprising an opening communicating with the first inner space and the second inner space;
   an input optical fiber, located in the first side of the containing unit along a first axis and held in the first inner space and extending from the first side to the second side along the first axis, including:
   a first terminal located in the first side; and
   a second terminal opposite to the first terminal;
   an output unit, comprising:
   a first output optical fiber, held in one of the guiding channels along the first axis and comprising a first terminal set in the second side and a second terminal adjacent to the second terminal of the input optical fiber; and
   a second output optical fiber, held in another of the guiding channels along a second axis parallel to the first axis and comprising a first terminal set in the second side and a second terminal adjacent to the second terminal of the input optical fiber; and
   a driving assembly, located in the second inner space of the containing unit, comprising:
   a switching lever shifted in either a first position or a second position; and
   a performing edge touching the switching lever and attached with the input optical fiber in the form of the point-contact;
   whereby the switching lever lowers the performing edge such that the input optical fiber is aligned with the first output optical fiber in the form of optical coupling when the switching lever is in the first position; the switching lever elevates the performing edge such that the input optical fiber is aligned with the second output optical fiber in the form of optical coupling when the switching lever is in the second position; and
   the performing edge of the switching lever is shifted in either the first position or the second position through the opening.

2. The optical channel shifting device of claim 1, wherein the driving assembly comprises
   an electromagnet relay unit comprising the switching lever; and
   a cylinder connected with the switching lever and the performing edge is defined on the cylinder.

3. The optical channel shifting device of claim 2, wherein the electromagnet relay unit further comprises:
   a supporting rod supporting the switching lever to shift between the first position and the second position; and
   an electromagnet controlling the switching lever to shift between the first position and the second position.

4. The optical channel shifting device of claim 2, wherein the cylinder includes a cylindrical surface along a periphery thereby and a top edge of the cylindrical surface defines the performing edge.

5. The optical channel shifting device of claim 2, wherein the cylinder is made of an amorphous inorganic material.

6. The optical channel shifting device of claim 5, wherein the amorphous inorganic material is glass.

7. The optical channel shifting device of claim 1, wherein the containing unit further comprises a location block set in the first inner space and between the first input optical fiber and the second side; the guiding channels are respectively set in the location block along the axis directions of the first axis and the second axis.

* * * * *